United States Patent Office

Re. 28,208
Reissued Oct. 22, 1974

28,208

DIRECT POSITIVE FOGGED SILVER HALIDE EMULSION SENSITIZED WITH A CYCLOHEPTATRIENE CYANINE DYE

Akira Sato, Minoru Sonoda, Keisuke Shiba, Masanao Hinata, and Tetsuo Nozoe, Minami-ashigara-machi, Kanagawa, Japan, assignors to Fuji Photo Film Co., Ltd., Kanagawa, Japan

No Drawing. Original No. 3,687,674, dated Aug. 29, 1972, Ser. No. 90,070, Nov. 16, 1970. Application for reissue Feb. 20, 1974, Ser. No. 444,229

Claims priority, application Japan, Nov. 14, 1969, 44/91,238

Int. Cl. G03c *1/36*

U.S. Cl. 96—101 16 Claims

Matter enclosed in heavy brackets [ ] appears in the original patent but forms no part of this reissue specification; matter printed in italics indicates the additions made by reissue.

ABSTRACT OF THE DISCLOSURE

A direct positive silver halide emulsion comprising at least one dye of the formula:

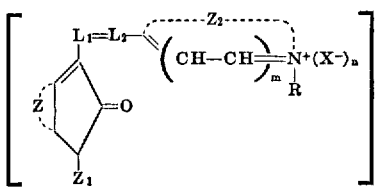

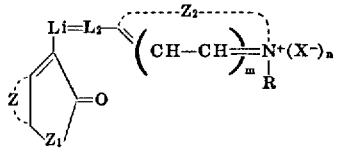

wherein Z is an organic substituted or unsubstituted atomic group necessary to complete a cycloheptatriene ring, which may be optionally substituted with a troponoid compound; $Z_1$ is an oxygen atom or N—H; $Z_2$ is an organic substituted or unsubstituted atomic group necessary to complete a 5 or 6 membered heterocyclic ring; R is a member of the alkyl series selected from the group consisting of lower alkyl, hydroxy (lower) alkyl, lower [alkoxy] *alkoxyalkyl,* sulfo(lower) [alkoxy] *alkyl, carboxy(lower)alkyl, acetoxy(lower)alkyl,* vinyl methyl, aralkyl sulfo aralkyl; $L_1$ and $L_2$ are a group from the methine series, said $L_2$ capable of forming a methylene chain together with said R; X is an anion, and m and n each is 0 or 1, providing that n is 0 when the dye forms an intramolecular salt, and a photographic light-sensitive element formed from said emulsion. The present invention also extends to the dyes themselves and a process for preparing the same.

FIELD OF THE INVENTION

The present invention relates to a silver halide photographic emulsion and particularly to a direct positive photographic emulsion containing a novel dye.

DESCRIPTION OF THE PRIOR ART

When a silver halide light-sensitive material is exposed to light in a wave length region sensitive to the material and then developed, the image density is increased with an increase in exposure, thus reaching a maximum value. When the exposure amount increases, the image density is reduced again and finally, a reversal image is obtained. This phenomenon is generally termed "solarization."

It has also been known that in some silver halide emulsions which are fogged optically or chemically, a similar reversal phenomenon by light is observed. Hereinafter, such a silver halide emulsion is called the "direct positive silver halide photographic emulsion."

In general, the reversal sensitivity of the direct positive silver halide emulsion is increased by the addition of a dye to said emulsion. However, sometimes when this is done, the maximum density ($D_{max.}$) [See Mees, The Theory of the Photographic Process, Revised Ed. (p. 250) or 3rd Ed. (pp. 149–163)], is lowered and the contrast thereof is reduced, whereby a sufficient image cannot be obtained.

Thus, it is extremely important when producing direct positive light-sensitive materials to maintain a definite or constant maximum density to, increase the sensitivity.

SUMMARY OF THE INVENTION

It is, therefore, an object of the present invention to provide a direct positive silver halide photographic emulsion capable of maintaining a definite maximum density and providing a high sensitivity.

Accordingly, the object of this invention is attained by adding to the direct positive silver halide photographic emulsion, a dye of the Formula I:

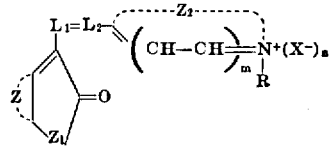

(I)

wherein

Z represents an atomic group necessary to complete the cycloheptatriene ring. The group represented by Z may also be substituted by a substituent known as a troponoid compound, such as, an alkyl group having 1–4 carbon atoms, such as a methyl group, an isopropyl group, etc.; a halogen atom, such as a chlorine atom, a bromine atom, etc.; an alkoxyl group such as a methoxyl group, etc.; an aryl group such as a naphthyl or phenyl group, a tolyl group and a nitrophenyl group, etc.

$Z_1$ represents O or N—H.

$Z_2$ represents an atomic group necessary to complete a 5-membered or 6-membered heterocyclic ring. Illustrative of the heterocyclic rings represented by $Z_2$ are those of the oxazoline series, oxazole series, benzoxazole, naphthoxazole series, thiazoline series, thiazole series, benzothiazole series, naphthothiazole series, selenazol series, benzoselenazole series, naphthoselenazole series, 2-pyridine series, 4-pyridine series, 2-quinoline series, 4-quinoline series, imidazole series, benzimidazole series, naphthoimidazole series and the like.

The heterocyclic ring (which may comprise a heterocyclic ring per se or a benzene ring condensed with a heterocyclic ring) may be substituted by known substituents in the field of sensitizing dyes such as an alkyl group ($C_1$–$C_4$), aryl group (phenyl or naphthyl), hydroxyl group, alkoxyl group ($C_1$–$C_3$), halogen atom (Cl, Br, F and I), and nitro group.

R represents a group of the alkyl series, such as a methyl group, ethyl group, n-propyl group, B-hydroxyethyl group, *B-methoxyethyl group* B-acetoxyethyl group, B-carboxyethyl group, γ-sulfopropyl group, δ-sulfobutyl group, vinylmethyl group, benzyl group, phenethyl group, p-sulfophenethyl group, etc.

$L_1$ and $L_2$ represent a group of the methine series, e.g., a methine group or a methine group having a substituent such as a methoxyethyl group, ethoxyethyl, carboxyethyl and hydroxyethyl. In addition, $L_2$ may form a methylene chain together with R.

X represents an anion such as halogen, perchlorate, p-toluene sulfonate, benzene sulfonate, thiocyanate, methyl sulfate, ethyl sulfate, etc., and m and n respectively, represent 0 or 1, providing that n is 0 when the dye forms intramolecular salt.

A general method for synthesizing the dye of the present invention is briefly described below:

The dye represented by the above-mentioned general Formula I may be obtained by reacting a compound represented by the general Formula II:

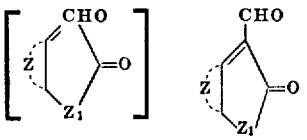

and a heterocyclic quaternary ammonium salt represented by the following general Formula III:

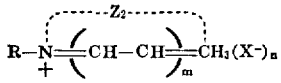

(III)

in acetic anhydride under heating.

The definitions of Z, $Z_1$, $Z_2$, R, X, m and n in general Formulas II and III are the same as provided for general Formula I.

The compounds of general Formula II may be easily produced by one skilled in the art based on the descriptions in "Daiyuki Kagaku (Grand Organic Chemistry), vol. 13, Non-Benzenic Aromatic Cyclic Compounds, published by Asakura Book Co.

The compounds of Formula III may be prepared according to the description given in the text "Chemistry of Heterocyclic Compounds," vol. 18 (1964).

The preferred embodiments illustrative of the dyes to be used in the present invention are those shown below. However, the dyes to be used in our invention are not limited to these exclusively.

Dye I..... 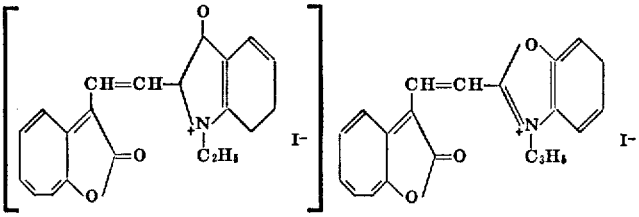 $\lambda_{max.}^{MeOH*}$ 498 mμ.

Dye II..... 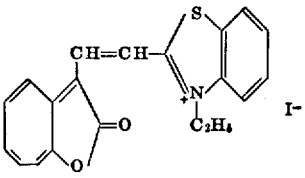 514 mμ.

Dye III.... 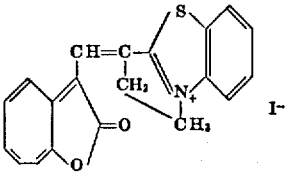 495 mμ.

Dye IV.... 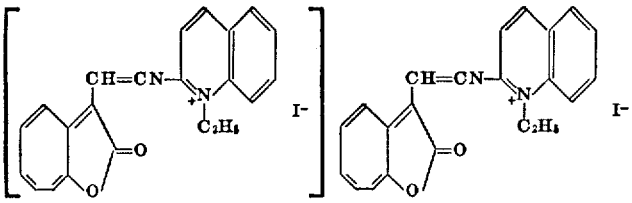 510 mμ.

Dye V..... 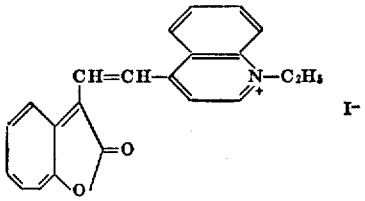 510 mμ.

Dye VI.... 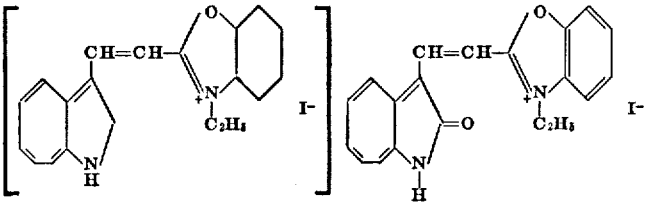 532 mμ.

TABLE—Continued
| | | |
|---|---|---|
| Dye VII... | 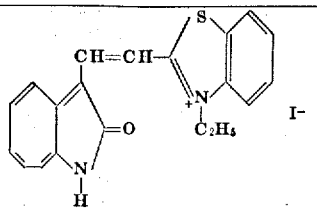 | 542 mμ. |
| Dye VIII.. | 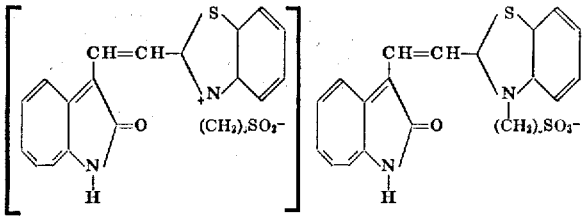 | 543 mμ. |
| Dye IX.... | 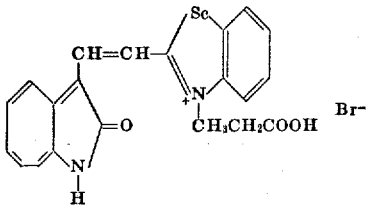 | 545 mμ. |
| Dye X..... | 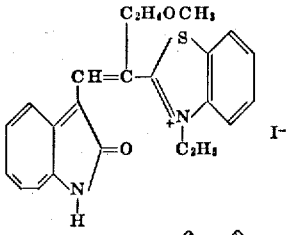 | 520 mμ. |
| Dye XI.... | 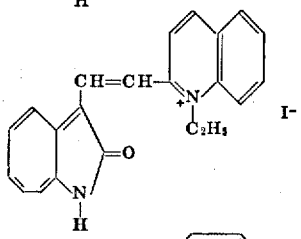 | 534 mμ. |
| Dye XII... | 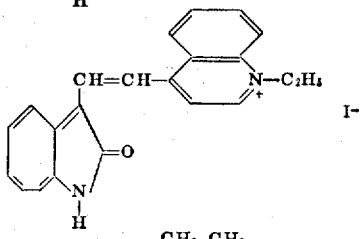 | 546 |
| Dye XIII.. | 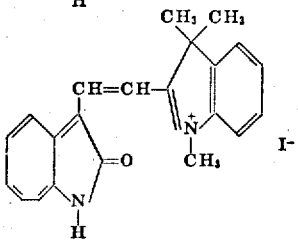 | λ MeOH max. mμ. |
| Dye XIV.. | 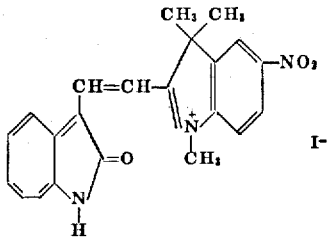 | λ MeOH max. 586 mμ. |

A procedure for producing the dyes applicable to the present invention will be described below.

Synthesis 1

(Dye I) 2-[2-(1-oxaazulane-2-one-3-yl)vinyl]-3-ethylbenzoxazolium iodide.—To 1 ml. of acetic anhydride were added 30 mg. of 3-formyl-1-ozaazulanone and 60 mg. of 3-ethyl-2-methylbenzoxazolium iodide. The mixture was heated to 135° C. for 30 minutes on an oil bath. The crystals formed were collected and washed with a large amount of hot ethanol, 40 mg. of a dark red crystal having a melting point of 201° C. was obtained.

Synthesis 2

(Dye VII) 2-[2-(1-azaazulan-2-one-3-yl)vinyl]-3-ethylbenzothiazolium iodide.—To 3 ml. of acetic anhydride were added 150 mg. of 3-formyl-1-azaazulanone and 280 mg. of 3-ethyl-2-methylbenzothiazolium iodide. The mixture was heated to 135° C. for 30 minutes on an oil bath. When the crystals thus deposited were washed with a large amount of hot methanol, 400 mg. of a dark purple crystal having a melting point of 261° C. was obtained.

It is astonishing that although the dye represented by the general Formula I mentioned above shows no sensitizing effect (in other words, reduces the sensitivity in usual negative type photographic emulsions) it exhibits an excellent sensitizing effect to a direct positive silver halide photographic emulsion.

The direct positive silver halide photographic emulsion containing the dye represented by Formula I should exhibit a sensitivity which is high and maintain a maximum density of the photographic emulsion almost identical to that of the photographic emulsion absent the dye.

In addition, the dye represented by Formula I to a direct positive photographic emulsion, should maintain a low minimum density.

Usually, it is preferred to add the dye represented by Formula I to the silver halide photographic emulsion as a solution. In this regard, suitable solvents for the dye solution may comprise water, methanol and ethanol.

The effective amount of the dye to be added to the direct positive photographic emulsion ranges from 10 mg. to 1 g. and preferably, from 100 mg. to 500 mg./kg. of emulsion.

The silver halide photographic emulsion to be used in the present invention may be fogged to the maximum density by light or the addition of a chemical fogging agent. If a chemical fogging agent is employed, it should be one which fogs silver halide without impairing the photographic emulsion. Illustrative of these are thiourea dioxide, stannous chloride, formaldehyde, or hydrazine.

Further, the silver halide emulsion to be used in this invention may be fogged by addition of a combined chemical fogging agent and a gold salt.

Subsequent to the fogging operation of the silver halide emulsion, additional additives, such as a coating aid or a hardening agent may be incorporated in the photographic emulsion. Also, if desirable, a color coupler may be incorporated in the silver halide photographic emulsion.

The pH and the pAg of the photographic emulsion are then adjusted and after adding the dye represented by the Formula I to the photographic emulsion, the emulsion is stirred and applied to a suitable support. As the suitable support, there may be employed, a synthetic resin film, such as a cellulose derivative film or a polyethylene terephthalate film, a glass sheet, a baryta-coated paper, a synthetic paper and a laminated paper.

A better understanding of the present invention will be attained from the following examples, which are merely illustrative and not limitative of the present invention:

Example 1.—Aqueous solutions of potassium bromide and silver nitrate were added simultaneously to an aqueous gelatin solution and the mixture was stirred vigorously for 45 minutes at a temperature of 60° C., to form silver bromide and after adding thiourea dioxide and potassium chloroaurate, the mixture was warmed for 20 minutes. Thereafter, the silver halide was sedimented by adding a sedimentation agent and after dispersing the silver halide thus precipitated and washing it twice with water, the silver halide was added and redispersed in an aqueous gelatin solution containing 7.5% by weight of gelatin.

The emulsion was divided into several parts and after adding the dye represented by the general Formula I to each of the divided emulsions, the emulsion was applied to a cellulose acetate base and then dried.

The sample thus produced was exposed by means of a sensitometer and developed for 2 minutes at 20° C., using a developing liquid having the composition shown in Table 1.

TABLE 1

| | G. |
|---|---|
| Metol | 3.1 |
| Hydroquinone | 12 |
| Sodium sulfite | 45 |
| Anhydrous sodium carbonate | 67.5 |
| Potassium bromide | 1.9 |
| Water to make 1 liter. | |

The sample thus developed was fixed, washed with water, and dried. Thereafter, by measuring the optical density of the sample with a densitometer, a characteristic curve was calculatedd.

The results are shown in Table 2, in which the relative sensitivity was determined assuming the sensitivity of pinacryptol yellow being 100.

TABLE 2

| Amount of dye (mg./kg.-emulsion) | Relative sensitivity | $D_{max.}$ when not exposed | $D_{min.}$ when exposed |
|---|---|---|---|
| None (control) [1] | <12.9 | 1.59 | 1.46 |
| Dye VI (400) | 445 | 1.48 | 0.31 |
| Dye VIII (400) | 214 | 1.51 | 0.62 |
| Dye XI (400) | 99 | 1.41 | 0.60 |
| Dye XII (400) | 301 | 1.52 | 0.73 |

[1] Pinacryptol yellow.

Example 2.—An aqueous solution of potassium bromide and silver nitrate were added simultaneously to an aqueous gelatin solution. The mixture was stirred for 45 minutes at 60° C., to form silver bromide. Then, potassium iodide (0.6 mole percent of silver nitrate) was added to the emulsion and the emulsion was ripened for 40 minutes.

After the ripening was completed, hydrazine dihydrochloride and potassium chloroaurate were added to the emulsion, the mixture being warmed for 16 minutes at 45° C. Subsequently, the silver halide was precipitated by adding a flocculating agent thereto. The silver halide thus precipitated was recovered, washed twice with water and then dispersed in an aqueous gelatin solution containing 7.5% by weight of gelatin.

The silver halide photographic emulsion thus prepared was divided into several parts. After adding the dye represented by Formula I to each of the divided photographic emulsions, the mixture was stirred and the silver halide emulsion was applied to a cellulose acetate film and dried. The sample thus dried, was exposed by means of a sensitometer and developed for 2 minutes at 20° C., using a developing liquid having the composition shown in Table 1 and described in Example 1. Then, the sample was fixed, washed with water and dried. After processing, by measuring the optical density of the sample by means of a densitometer, the characteristic curve was obtained. The results thus obtained are shown in Table 3.

TABLE 3

| Amount of dye (mg./kg.-emulsion) | Relative sensitivity | $D_{max.}$ when not exposed | $D_{min.}$ when exposed |
|---|---|---|---|
| None | 0.01 | 1.36 | 1.27 |
| Dye I (400) | 302 | 1.28 | 0.06 |
| Dye II (400) | 214 | 1.20 | 0.05 |
| Dye IV (400) | 178 | 1.25 | 0.06 |
| Dye V (400) | 158 | 1.25 | 0.06 |
| Pinacryptol yellow | 100 | 0.88 | 0.06 |

Furthermore, almost the same results were obtained by repeating the same procedure using Dyes (III), (VII), (IX) and (X) shown above.

Example 3.—An aqueous solution containing 70 gms. of potassium bromide and 6 gms. of sodium chloride as well as an aqueous solution containing 100 gms. of silver nitrate were added simultaneously to an aqueous gelatin solution containing 10% by weight of gelatin. The mixture was reacted at a temperature of 50° C., to form a fine grained silver halide. Then, after adding 1 gm. of potassium iodide and 40 gms. of gelatin thereto, the mixture was adjusted to a pH of 9.5 with sodium carbonate. Thereafter, to said emulsion was added 5 ml. of an aqueous solution containing 1% by weight of hydrazine dihydrochloride. The emulsion was ripened for 40 minutes to form fog-nuclei. Then, the emulsion was adjusted to a pH of 6.0 by the addition of 10% (by weight) of citric acid, cooled and washed with water.

The silver halide photographic emulsion thus produced was divided into several parts. After adding the dye represented by Formula I to each of the divided photographic emulsions and stirring the mixture, the silver halide emulsion was applied to a cellulose acetate and dried. The sample thus dried was exposed by means of a densitometer and developed for 2 minutes at 20° C., using developing liquid having the composition shown in the Table 1 and described in Example 1. Then, the sample was fixed, washed with water and dried. After processing, by measuring the optical density of the sample with a densitometer, the characteristic curve was obtained.

The results thus obtained are shown in Table 4.

TABLE 4

| Amount of dye (mg./kg.-emulsion) | Amount of pinacryptol yellow (mg./kg.-emulsion) | Relative sensitivity | $D_{max.}$ when not exposed | $D_{min.}$ when exposed |
|---|---|---|---|---|
| None | | 0.1 | 3.50 | 1.10 |
| Dye I (150) | | 640 | 3.30 | 0.09 |
| Dye II (150) | | 780 | 3.25 | 0.08 |
| Dye VI (150) | | 1,000 | 3.20 | 0.09 |
| Pinacryptol yellow | 150 | 100 | 3.20 | 0.09 |
| Pinacryptol yellow plus Dye (I) (150) | 150 | 500 | 3.25 | 0.07 |
| Pinacryptol yellow plus Dye (VI) (150) | 150 | 2,500 | 2.90 | 0.07 |

Dyes XIII and XIV exhibit the same properties as shown above for those dyes already enumerated.

Though the present invention has been adequately described in the foregoing specification and examples included therein, it is readily apparent that various changes and modifications may be made without departing from the scope thereof.

What is claimed is:

[1. A direct positive silver halide photographic emulsion comprising fogged silver halide grains and at least one dye of the formula:

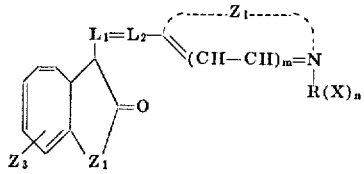

wherein $Z_3$ is a troponoid substituent on the cycloheptatriene ring said substituent is a member selected from the group consisting of lower alkyl ($C_1$–$C_4$), halogen, lower alkoxyl, aryl, alkylaryl and nitroaryl; $Z_1$ is an oxygen atom or N—H; $Z_2$ is an organic substituted or unsubstituted atomic group necessary to complete a 5 or 6 membered heterocyclic ring selected from the group consisting of the thiazole series, naphtholthiazole series, selenazole series, benzolselenazole series, naphoselenazole series, 2-pyridine series, 4-pyridine series, 2-quinoline series, 4-quinoline series, imidazole series, benzimidazole series and naphthioimidazole series; R is a member of the alkyl series selected from the group consisting of lower alkyl, hydroxy (lower) alkyl, lower alkoxy, sulfo (lower) alkoxy, vinylmethyl, aralkyl and sulfo arakyl; $L_1$ and $L_2$ are a group from the methine series, said $L_2$ capable of forming a methylene chain together with said R; X is an anion and *m* and *n* each is 0 or 1, providing that *n* is 0 when the dye forms an intramolecular salt, said dye being present in a sensitizing amount.]

2. The emulsion of claim [1] *17*, wherein said dye is a member selected from the group consisting of:

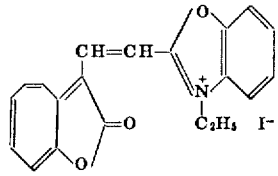

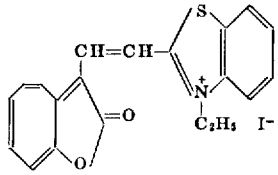

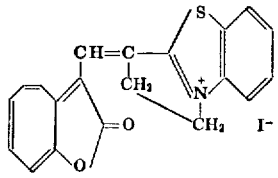

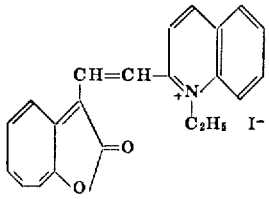

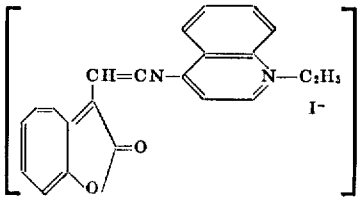

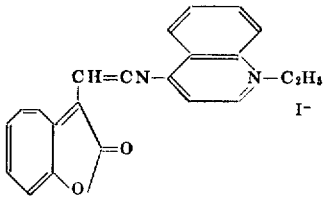

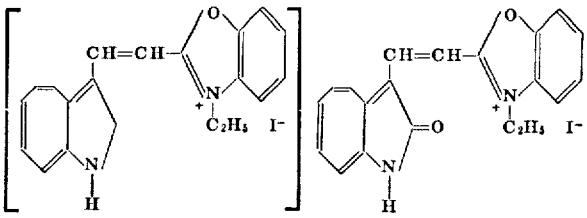

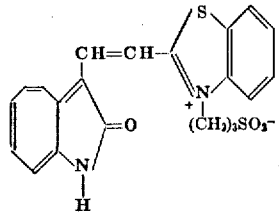

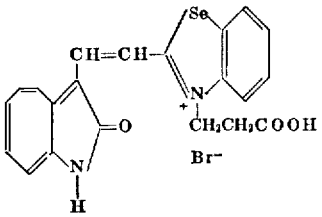

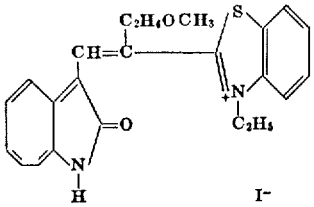

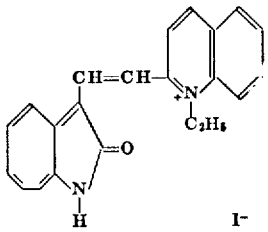

[and]

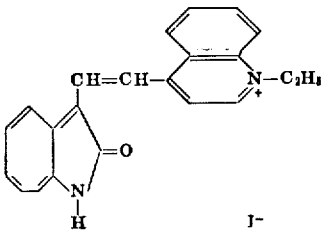

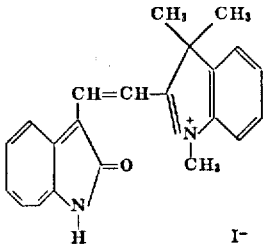

*and*

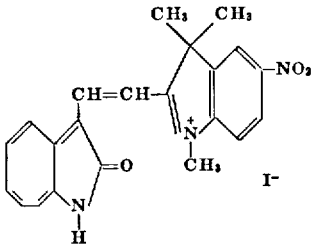

3. The emulsion of claim [1] *17*, wherein said silver halide photographic emulsion is fogged to the maximum density by light.

4. The emulsion of claim [1] *17*, wherein said silver halide photographic emulsion is fogged to the maximum density by the addition of a chemical fogging agent.

5. The emulsion of claim 4, wherein said chemical fogging agent is a member selected from the group consisting of thiourea dioxide, stannous chloride, formaldehyde and hydrazine.

6. The emulsion of claim [1] *17*, wherein said halide photographic emulsion is fogged by the addition of a combination of a chemical fogging agent and a gold salt.

7. An emulsion as claimed in claim [1] *17*, wherein an amount of the dye to be added to the emulsion ranges from 10 mg. to 1 gm./kg of emulsion.

8. A photographic light-sensitive element comprising a support having thereon at least one layer containing the direct positive silver halide photographic emulsion of claim [1] *17*.

9. The emulsion of claim [1] *17*, wherein the lower alkyl ($C_1$–$C_4$) troponoid substituent is a member selected from the group consisting of methyl and isopropyl.

10. The emulsion of claim [1] *17*, wherein the halogen troponoid substituent is a member selected from the group consisting of chlorine and bromine.

11. The emulsion of claim [1] *17*, wherein the lower alkoxyl troponoid substituent is methoxyl.

12. The emulsion of claim [1] *17*, wherein the aryl troponoid substituent is a member selected from the group consisting of naphthyl and phenyl.

13. The emulsion of claim [1] *17*, wherein the alkylaryl troponoid substituent is tolyl.

14. The emulsion of claim [1] *17*, wherein the nitro aryl troponoid substituent is nitro phenyl.

15. The emulsion of claim [1] *17*, wherein $L_1$ and $L_2$ are members selected from the group consisting of methine, methoxyethyl methine, ethoxyethyl methine, carboxyethyl methine and hydroxyethyl methine.

16. The emulsion of claim 7, wherein the amount of dye to be added to the emulsion ranges from 100 mg.–500 mg./kg. of emulsion.

*17. A direct positive silver halide photographic emulsion comprising fogged silver halide grains and at least one dye of the formula:*

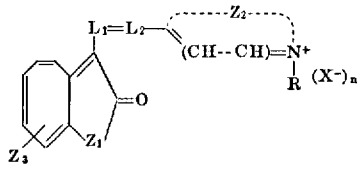

*wherein $Z_3$ is a troponoid substituent on the cycloheptatriene ring said substituent being a member selected from the group consisting of a lower alkyl ($C_1$–$C_4$) group, a halogen atom, a lower alkoxyl group, an aryl group, an alkylaryl group and a nitroaryl group; $Z_1$ is a member selected from the group consisting of an oxygen atom and a N–H group; $Z_2$ is an organic substituted or unsubstituted atomic group necessary to complete a 5 or 6 membered heterocyclic ring selected from the group consisting of the oxazoline series, oxazole series, benzoxazole series, naphthoxazole series, thiazoline series, thiazole series, benzothiazole series, naphthothiazole series, selenazole series, benzolselenazole series, naphthoselenazole series, 2-pyridine series, 4-pyridine series, 2-quinoline series, 4-quinoline series, imidazole series, benzimidazole series, and naphthoimidazole series; R is a member selected from the group consisting of a lower alkyl group, a hydroxy (lower) alkyl group, a lower alkoxy alkyl group, a sulfo (lower) alkyl group, a carboxy (lower) alkyl group, an acetoxy (lower) alkyl, a vinyl methyl group, an aralkyl group, and a sulfo aralkyl group; $L_1$ and $L_2$ are a group*

*from the methine series, said $L_2$ capable of forming a methylene chain together with said R group; X is an anion and m and n each is 0 or 1, providing that n is 0 when the dye forms an intramolecular salt, said dye being present in a sensitizing amount.*

References Cited

The following references, cited by the Examiner, are of record in the patented file of this patent or the original patent.

Ishikawa et al.: "Seven Membered Ring Compounds as a Densensitizing Agent," Bulletin of the Society of Scientific Photography of Japan, No. 18, December 1968, pp. 5–15.

DAVID KLEIN, Primary Examiner

W. H. LOUIE, Jr., Assistant Examiner

U.S. Cl. X.R.

96—107, 108; 260—240